Nov. 27, 1956 IWAO ONO 2,772,193
PLASTIC MODIFIED NETS
Filed Sept. 24, 1954 2 Sheets-Sheet 1
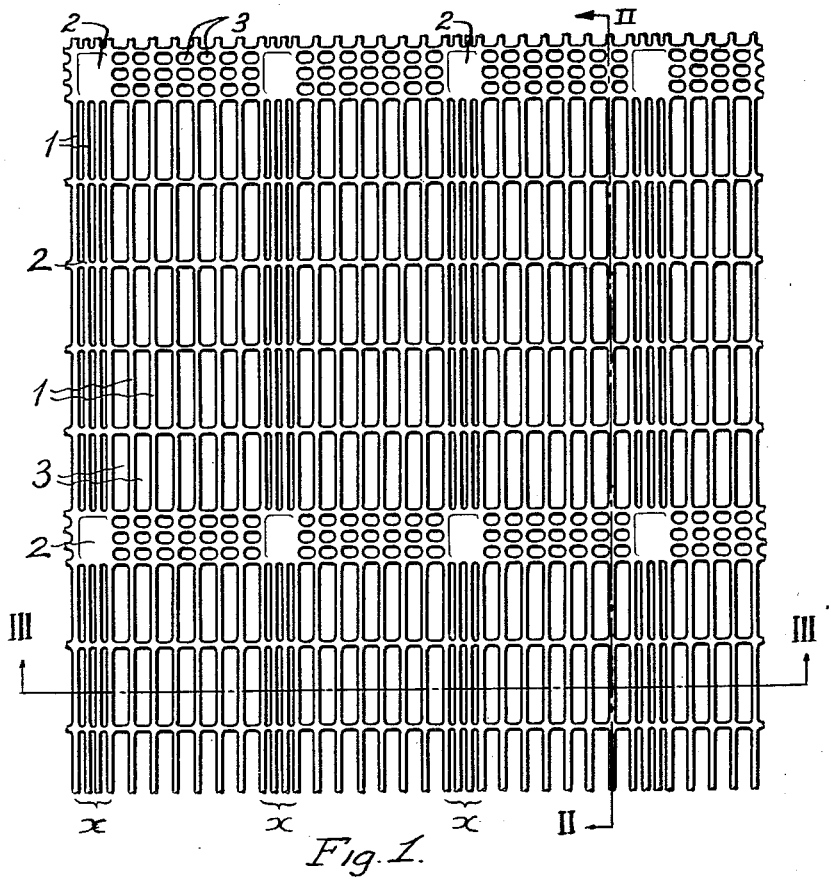
Fig. 1.
Fig. 2
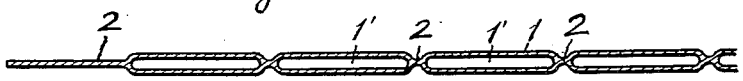
Fig. 3
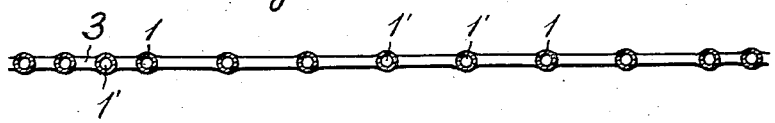
Inventor,
Iwao Ono,
by Hall & Houghton
Attorney.

Nov. 27, 1956    IWAO ONO    2,772,193
PLASTIC MODIFIED NETS
Filed Sept. 24, 1954    2 Sheets—Sheet 2

Inventor,
Iwao Ono,
by Hall & Houghton
Attorney.

United States Patent Office 2,772,193
Patented Nov. 27, 1956

2,772,193
PLASTIC MODIFIED NETS
Iwao Ono, Fuse, Japan
Application September 24, 1954, Serial No. 458,096
8 Claims. (Cl. 154—54)

My invention relates to internally compartmented plastic nets and more particularly to such nets for the use as matting, packing, substitutes for glass plates or the like.

The object of the present invention is the provision of internally compartmented plastic nets having the features of neutralizing the shock of concussion and pretty appearance.

With this object in view, the present invention consists in the mode of construction and arrangement of parts as hereinafter more fully described.

Reference is to be had to the accompanying drawings, in which like reference characters indicate corresponding parts throughout the several views, and in which Figure 1 is a plan view of a part of an internally compartmented plastic net embodying my invention.

Figure 2 is a sectional view on the line II—II of Figure 1.

Figure 3 is a sectional view on the line III—III of the same.

Figure 4:
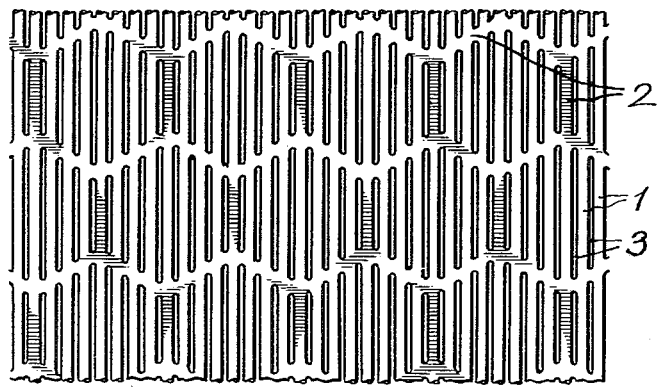
Figures 4, 5 and 6 are plan views of parts of modifications of internally compartment plastic nets embodying my invention.
Figure 5:
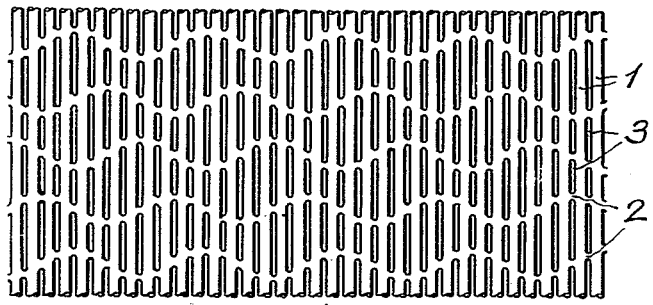
Figure 6:
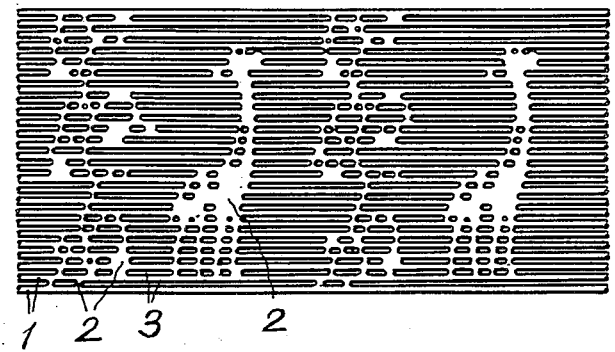

As shown in Figures 1, 2 and 3, many pipes 1 of plastic material such as the thermoplastic vinyl chloride are arranged adjacently in parallel to each other. The pipes of parts $x$ are arranged more closely than the other parts. The pipes are pressed and heated to be flattened and welded so as to form air chambers 1' between the adjacent welded points respectively. Welded points 2 of the pipes 1 being flattened and enlarged to the lateral directions, the pipes of the parts $x$ are welded with each other. Connecting strips or bridging elements of the same material with that of the pipes 1 may be placed upon the pipes, and welded to the pipes so as to connect or merge the pipes with each other. Gaps 3 are formed between the adjacent pipes, which permit air or water to flow through them. The pipes can easily be welded by means of a high frequency electric sewing machine in straight lines, combined straight lines, curved lines or suitable designs as shown in Figures 1, 4, 5 and 6 respectively. The pipes may be arranged so as to cross each other. In this case, the crossing points are welded with each other. And a pipe 1 may be furled into a swirl to weld radially.

According to the present invention, not only the material being elastic and flexible, but the pipes having the air chambers or internal compartments formed by internal merger of their walls, the net has the features of neutralizing the shock of concussion, and is light in weight. An the air chambers being distributed all over the net, it is stable even when irregular things are put on the net, and it can be used when it is broken partially. Moreover, the welded lines forming grooves, the appearance of the net is very pretty. Furthermore, thread or yarn may be inserted into the pipe 1 so as to reduce its elasticity by becoming anchored thereto at said crossing points as the pipes are flattened and welded thereat to divide them into air chambers.

Having thus described my invention, what I claim is:
1. A method of forming an internally compartmented flexible plastic net that comprises arranging a row of flexible thermo-plastic tubes parallel to each other, and internally compartmenting said tubes and simultaneously interconnecting the same to form a net by flattening and welding together spaced regions intermediate the lengths of said tubes by the application of heat and pressure to such spaced regions leaving the tubes separate from each other between such spaced regions.

2. A method of forming an internally compartmented flexible plastic net according to claim 1, that also comprises steps of superimposing on said row of tubes bridging elements of material weldable to said tubes and extending across said tubes intermediate of the lengths thereof, and flattening and welding together said tubes and bridging elements at said crossing points, whereby the tubes are simultaneously compressed and internally divided into compartments as they are welded to said bridging elements at said crossing points to form the net.

3. A method of forming an internally compartmented flexible plastic net according to claim 1, that also comprises the step of superimposing on said row of tubes a further set of tubes of the same material arranged to extend across said row of tubes intermediate of the lengths thereof, and flattening and welding together said crossing tubes at their crossing points so that the welding internally merges the walls of said tubes and simultaneously interconnects said crossing tubes at said crossing points to form a net while internally subdividing both the tubes of said row and the tubes of said set into compartments.

4. An internally compartmented flexible plastic net comprising a row of flexible thermoplastic tubes arranged parallel to each other and having a number of spaced regions thereof flattened and merged internally intermediate their ends, the tubes of said row being interconnected at said flattened portions.

5. An internally compartmented flexible plastic net comprising a row of flexible thermoplastic tubes arranged parallel to each other, said tubes having a number of spaced regions thereof collapsed and merged internally intermediate their ends, said net comprising flexible thermoplastic bridging elements crossing said tubes at said collapsed portions and merbed with said tubes thereat.

6. An internally compartmented flexible plastic net comprising a row of flexible thermoplastic tubes arranged parallel to each other, a set of flexible thermoplastic tubes extending transversely of said row of tubes, said tubes having spaced regions at the crossing points thereof collapsed and merged internally, and said tubes being merged with one another at said crossing points.

7. A method of forming an internally compartmented flexible plastic net that comprises arranging in general parallelism to each other a row of flexible thermoplastic tubes, threading yarn into said tubes, and internally compartmenting said tubes and simultaneously interconnecting the same to form a net by flattening and welding together spaced regions thereof by the application of heat and pressure to such spaced regions leaving the tubes separate from each other between such spaced regions.

8. An internally compartmented flexible plastic net comprising a row of flexible thermoplastic tubes arranged in general parallelism with each other, said tubes having yarns inserted therein, and said tubes having a number of spaced regions thereof flattened and merged internally intermediate their ends dividing them into compartments, the tubes of said row being interconnected at said flattened portions.

References Cited in the file of this patent

UNITED STATES PATENTS

| | | |
|---|---|---|
| 889,756 | Bukacek | June 2, 1908 |
| 2,100,492 | Sindler | Nov. 30, 1937 |
| 2,410,744 | Powers | Nov. 5, 1946 |
| 2,434,532 | Wurzburger | Jan. 13, 1948 |
| 2,550,465 | Gorski | Apr. 24, 1951 |